(12) United States Patent
Li et al.

(10) Patent No.: US 12,479,491 B1
(45) Date of Patent: Nov. 25, 2025

(54) FOLDABLE BABY STROLLER

(71) Applicants: Shenzhen Baitu Network Co., Ltd., Guangdong (CN); Ningbo Bonsing Outdoor Products Co., Ltd., Zhejiang (CN)

(72) Inventors: Guoxue Li, Ningbo (CN); Qinglin Xiao, Fuzhou (CN)

( * ) Notice: Subject to any disclaimer, the term of this patent is extended or adjusted under 35 U.S.C. 154(b) by 0 days.

(21) Appl. No.: 19/245,856

(22) Filed: Jun. 23, 2025

(30) Foreign Application Priority Data

Jun. 9, 2025 (CN) .......................... 202510762730.3

(51) Int. Cl.
| | |
|---|---|
| *B62B 9/08* | (2006.01) |
| *B62B 3/00* | (2006.01) |
| *B62B 3/02* | (2006.01) |
| *B62B 5/04* | (2006.01) |
| *B62B 5/06* | (2006.01) |
| *B62B 7/08* | (2006.01) |
| *B62B 9/20* | (2006.01) |

(52) U.S. Cl.
CPC .............. *B62B 7/08* (2013.01); *B62B 3/007* (2013.01); *B62B 9/082* (2013.01); *B62B 9/206* (2013.01); *B62B 3/025* (2013.01); *B62B 5/0433* (2013.01); *B62B 5/061* (2013.01)

(58) Field of Classification Search
CPC ........... B62B 3/007; B62B 3/02; B62B 3/025; B62B 5/0461; B62B 5/0433
See application file for complete search history.

(56) References Cited

U.S. PATENT DOCUMENTS

| | | | | |
|---|---|---|---|---|
| 4,573,224 | A * | 3/1986 | Saint .................... | A47D 13/063 5/99.1 |
| 9,327,749 | B2 * | 5/2016 | Young ..................... | B62B 5/08 |
| 9,950,729 | B2 * | 4/2018 | Choi ....................... | B62B 3/007 |
| 11,981,364 | B2 * | 5/2024 | Ma ......................... | B62B 5/0461 |
| 12,157,512 | B1 * | 12/2024 | Jiang ....................... | B62B 3/02 |
| 12,179,820 | B1 * | 12/2024 | Jiang ....................... | B62B 3/025 |
| 12,221,146 | B2 * | 2/2025 | Yang ....................... | B62B 5/067 |
| 12,365,379 | B2 * | 7/2025 | Sturgeon ................. | B62B 9/142 |
| 2003/0025301 | A1 * | 2/2003 | Banuelos, III .......... | B62B 3/022 280/47.38 |
| 2008/0282468 | A1 * | 11/2008 | Golias .................... | A47D 13/063 5/111 |

(Continued)

FOREIGN PATENT DOCUMENTS

CN 113135211 A * 7/2021 ............... B62B 3/02

*Primary Examiner* — Emma K Frick

(57) ABSTRACT

A foldable baby stroller includes a baby stroller main body, and the baby stroller main body includes a folding bottom plate; the baby stroller features convenient and efficient folding operation. By pressing the unlocking part of the latch, the locking of the telescopic rods can be quickly released by using the lever principle. When locking, it only needs to press the locking part to complete. During the folding process, the movement paths of the folding bottom plate and the folding side frame do not interfere with each other. The folding bottom plate realizes flipping and closing through the hinge connection piece, and the folding side frame adapts to the elevation of the middle connection piece by extracting the sleeve rod from the sleeve. The two work together smoothly. The supporting vertical frame remains fixed and moves closer with the stroller.

8 Claims, 6 Drawing Sheets

(56) References Cited

U.S. PATENT DOCUMENTS

| | | | |
|---|---|---|---|
| 2023/0219608 A1* | 7/2023 | Jiang | B62B 3/025 |
| | | | 280/651 |
| 2023/0242168 A1* | 8/2023 | Clemmer | B62B 3/007 |
| | | | 280/651 |
| 2025/0050928 A1* | 2/2025 | Meyer | B62B 3/04 |
| 2025/0162639 A1* | 5/2025 | Zehfuss | B62B 3/007 |

* cited by examiner

FOLDABLE BABY STROLLER

1. TECHNICAL FIELD

The invention relates to the technical field of mother and baby products, in particular to a foldable baby stroller.

2. BACKGROUND ART

A baby stroller is a tool vehicle designed to facilitate outdoor activities for infants. It is not only the favorite walking transport for babies but also a necessity for mothers when taking their babies shopping on the street. However, according to the baby's growth and usage purposes, baby strollers can be divided into many types. They are mainly classified based on the load capacity, with the general test standard being 9 to 15 kilograms. An ordinary baby stroller can be used for about four to five years. However, the existing baby strollers still have the following shortcomings in use:

Existing strollers often suffer from interference between moving parts during folding, resulting in jamming. The folding process is cumbersome, requiring coordinated operation across multiple steps. The buckle design is prone to accidental release or difficult unlatching, and the folded structure tends to be loose and unstable, compromising both convenience and safety during use.

Therefore, we have proposed a foldable baby stroller to solve the above problems.

3. SUMMARY OF THE INVENTION

In view of the deficiencies in the prior art, the invention provides a foldable baby stroller, which solves the problems of jams caused by mutual interference of movement paths, cumbersome folding steps, easy accidental touch, difficult unlocking, and poor structural stability proposed in the above-mentioned background art.

To achieve the above object, the invention specifically adopts the following technical solutions:

a foldable baby stroller includes a baby stroller main body, and the baby stroller main body includes a folding bottom plate, folding side frames symmetrically arranged on both sides of the folding bottom plate, and supporting vertical frames;

the folding bottom plate includes a folding rod and bottom plate main bodies arranged on both sides of the folding rod, and both ends of one side of the bottom plate main body away from the folding rod are provided with supports;

the folding side frame includes middle connection pieces, two telescopic rods are movably arranged inside each middle connection piece, a bottom end of the telescopic rod is movably connected with one of the supports, and a latch is arranged on each telescopic rod;

the supporting vertical frames include two symmetrically arranged vertical rods, and a bottom end of the vertical rod is fixedly connected with one of the supports.

Further, both ends of the folding rod are provided with folding connection pieces; one side of one bottom plate main body is fixedly connected with two folding connection pieces at both ends, and one side of the other bottom plate main body is movably hinged with two folding connection pieces at both ends through hinge joints.

Further, a plurality of reinforcing cross bars and reinforcing longitudinal bars are fixedly arranged inside the bottom plate main body; both ends of one side of the bottom plate main body away from the folding rod are respectively hinged with two supports, and a stabilizing rod is fixedly arranged between two supports.

Further, wheels are movably arranged at a bottom of the supports, and a synchronous rod and a brake rod are arranged on two opposite wheels.

Further, each telescopic rod includes a sleeve and a sleeve rod movably sleeved inside the sleeve; opposite ends of the sleeve rod and the sleeve are respectively hinged with the middle connection piece and the support, and a notch is arranged at one end of the sleeve.

Further, the latch includes a first fixing piece and a second fixing piece; the first fixing piece is sleeved on one end of the sleeve, a clamp clamped with the notch is fixedly arranged at a bottom of the first fixing piece, a latch plate is hinged on one side of the first fixing piece, both ends of the latch plate away from the hinge position are a locking part and an unlocking part respectively.

Further, the second fixing piece is fixedly sleeved on the sleeve rod, and a buckle clamped with the locking part is arranged on one side of the second fixing piece.

Further, two first enclosing rods respectively located above two telescopic rods are also hinged inside the middle connection piece.

Further, the supporting vertical frame includes a second enclosing rod connecting two vertical rods through corner connection pieces, and one end of the corner connection piece away from the second enclosing rod is hinged with one end of the first enclosing rod.

Further, the supporting vertical frame further includes handles and two ends of each handle are respectively connected with tops of two vertical rods through connection heads.

Compared with the prior art, the invention provides a foldable baby stroller, which has the following beneficial effects:

the invention features convenient and efficient folding operation. By pressing the unlocking part of the latch, the locking of the telescopic rods can be quickly released by using the lever principle. When locking, it only needs to press the locking part to complete. During the folding process, the movement paths of the folding bottom plate and the folding side frame do not interfere with each other. The folding bottom plate realizes flipping and closing through the hinge connection piece, and the folding side frame adapts to the elevation of the middle connection piece by extracting the sleeve rod from the sleeve. The two work together smoothly. The supporting vertical frame remains fixed and moves closer with the stroller. With the design that the wheels always contact the ground and the stabilizing rod, the folding process is ensured to be stable and reliable. The linkage mechanism of multiple latches can not only prevent accidental folding caused by mis-touch but also realize synchronous unlocking when needed, taking into account both safety and operation convenience. Finally, the stroller can be quickly folded, which has a broad application prospect.

4. BRIEF DESCRIPTION OF ACCOMPANY DRAWINGS

Figure 1:
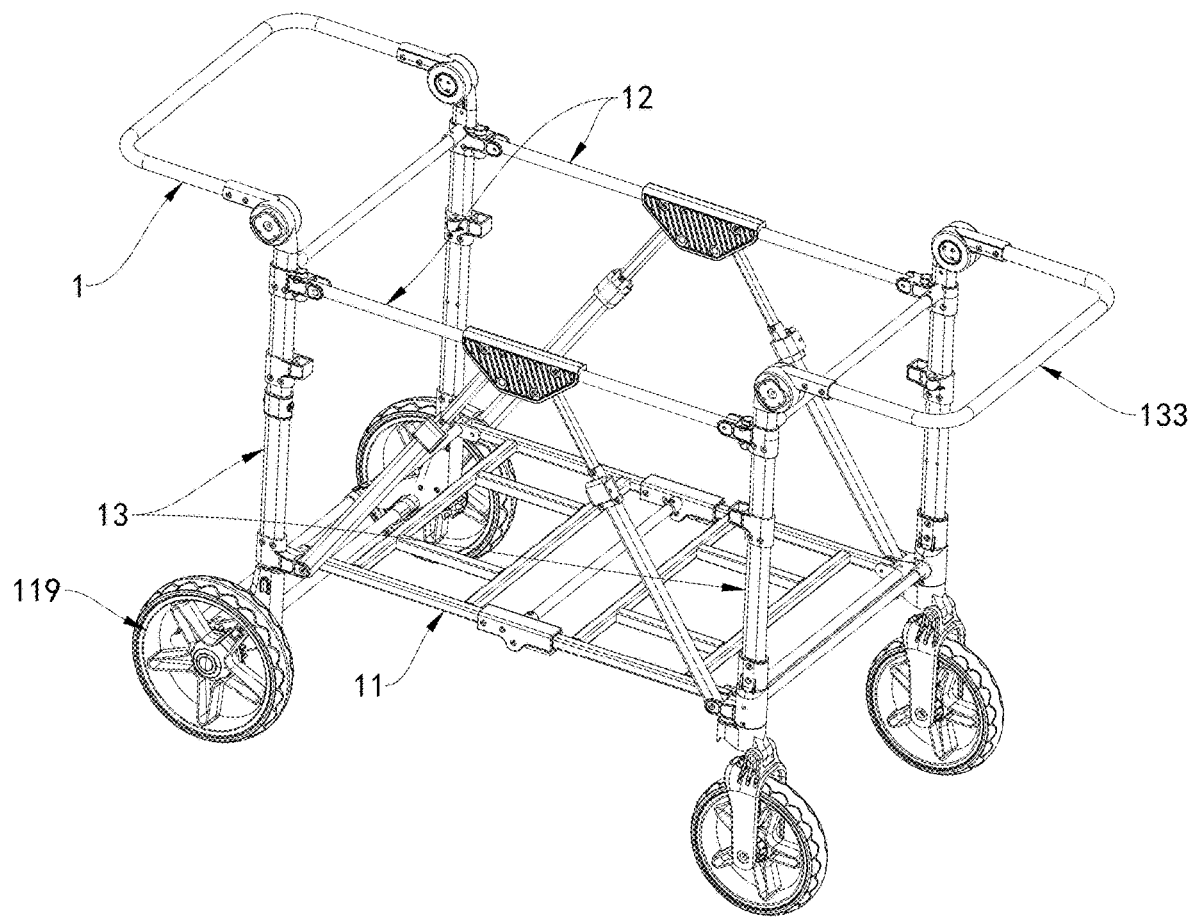
FIG. 1 is a schematic diagram of the main structure of the baby stroller of the invention.
Figure 2:
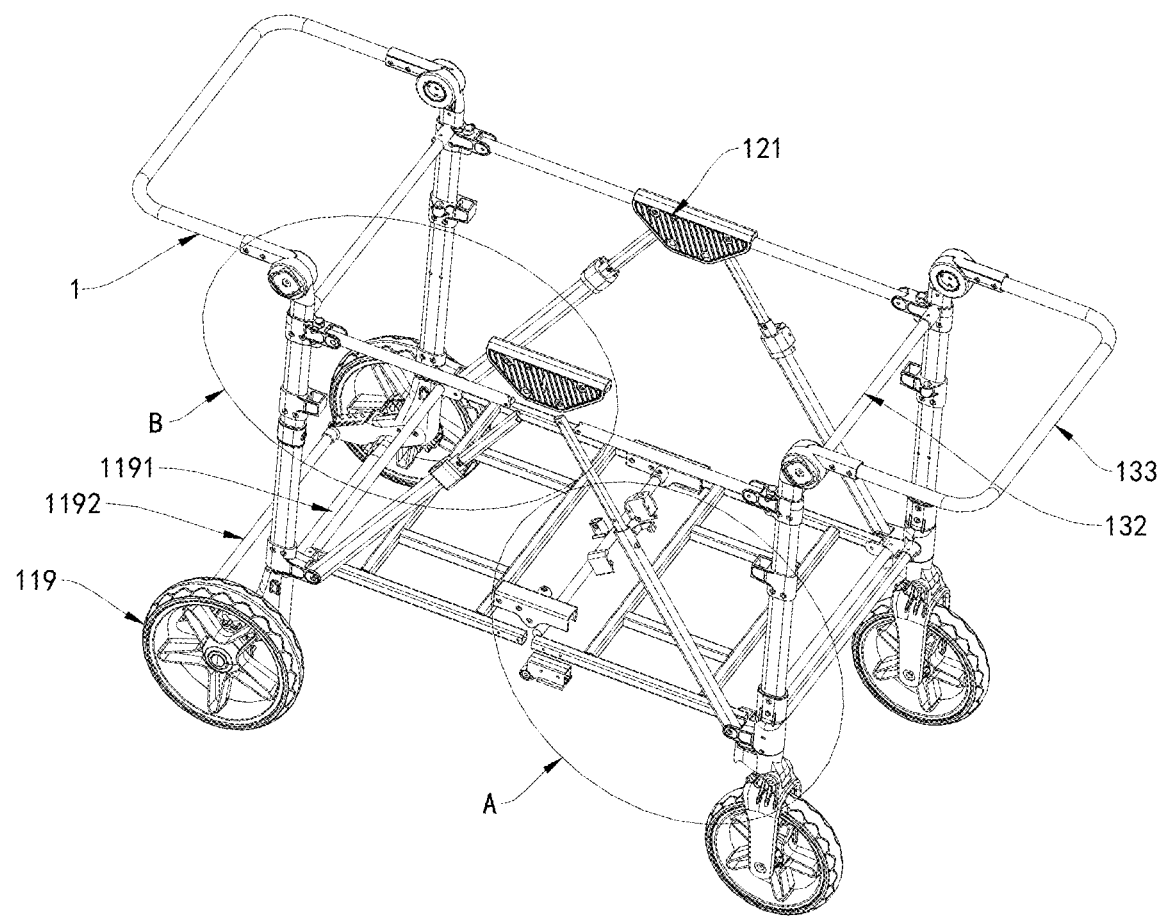
FIG. 2 is an exploded view of the main structure of the baby stroller of the invention.

In the drawings, 1. baby stroller main body; 11. folding bottom plate; 111. folding rod; 112. bottom plate main body; 113. support; 114. folding connection piece; 115. hinge joint; 116. reinforcing cross bar; 117. reinforcing longitudinal bar; 118. stabilizing rod; 119. wheel; 1191. synchronous rod; 1192. brake rod; 12. folding side frame; 121. middle connection piece; 122. telescopic rod; 1221. sleeve; 1222. sleeve rod; 1223. notch; 123. latch; 1231. first fixing piece; 1232. second fixing piece; 1233. clamp; 1234. latch plate; 1235. locking part; 1236. unlocking part; 1237. buckle; 124. first enclosing rod; 13. supporting vertical frame; 131. vertical rod; 132. second enclosing rod; 133. handle; 134. corner connection piece; 135. connection head.

5. SPECIFIC EMBODIMENT OF THE INVENTION

The technical solutions in the embodiments of the invention will be clearly and completely described below in conjunction with the accompanying drawings in the embodiments of the invention. Obviously, the described embodiments are only a part of the embodiments of the invention, rather than all the embodiments. All other embodiments obtained by those of ordinary skill in the art based on the embodiments of the invention without creative efforts shall fall within the protection scope of the invention.

Embodiment

As shown from FIG. 1 to FIG. 6, an embodiment of the invention provides a foldable baby stroller, including a baby stroller main body 1, and the baby stroller main body 1 includes a folding bottom plate 11, folding side frames 12 symmetrically arranged on both sides of the folding bottom plate 11, and supporting vertical frames 13.

The folding bottom plate 11 includes a folding rod 111 and bottom plate main bodies 112 arranged on both sides of the folding rod 111, and both ends of one side of the bottom plate main body 112 away from the folding rod 111 are provided with supports 113.

The folding side frame 12 includes middle connection pieces 121, two telescopic rods 122 are movably arranged inside each middle connection piece 121, a bottom end of the telescopic rod 122 is movably connected with one of the supports 113, and a latch 123 is arranged on each telescopic rod 122.

The supporting vertical frames 13 include two symmetrically arranged vertical rods 131, and a bottom end of the vertical rod 131 is fixedly connected with one of the supports 113.

Figure 3:
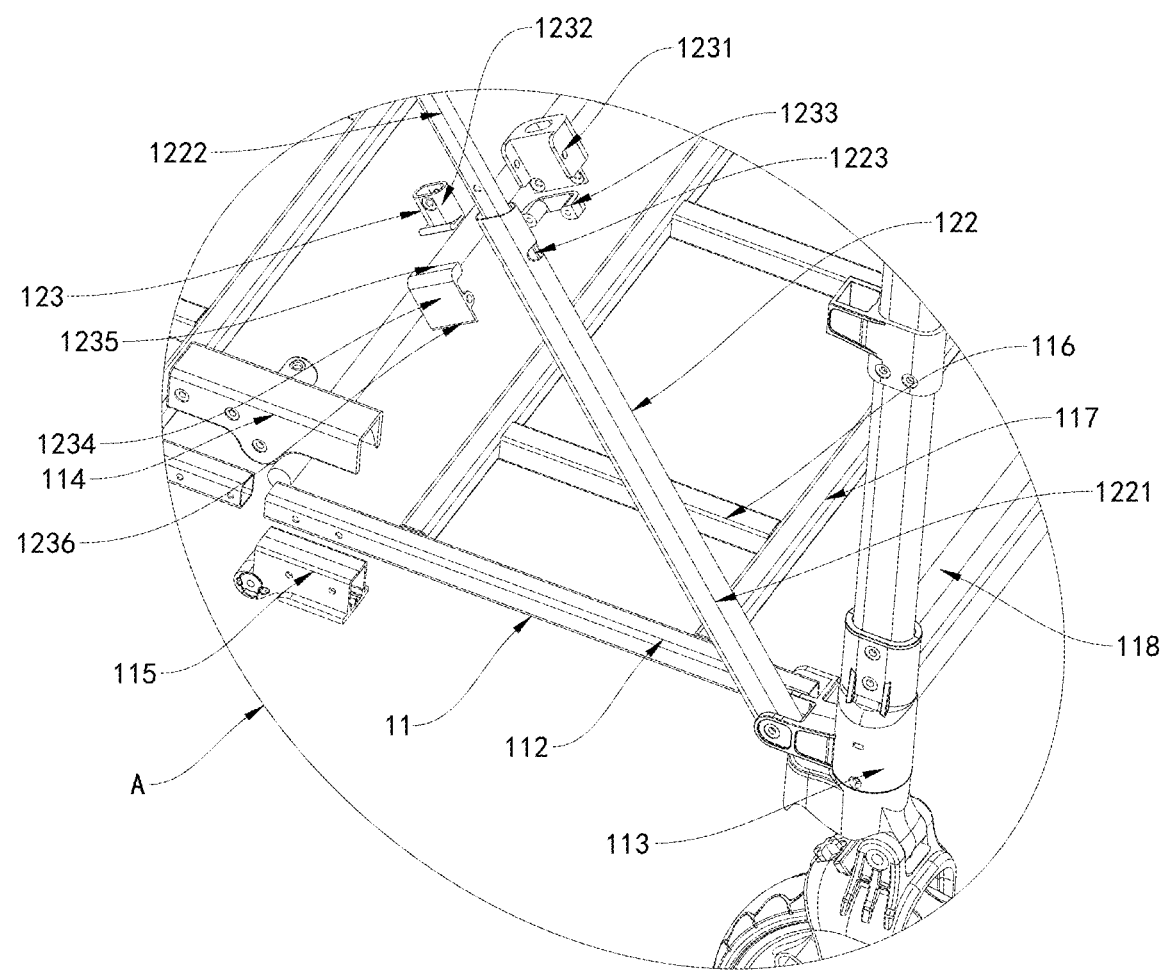
FIG. 3 is an enlarged structural view of part A in FIG. 2.

As shown in FIG. 3, in some embodiments, both ends of the folding rod 111 are provided with folding connection pieces 114; one side of one bottom plate main body 112 is fixedly connected with two folding connection pieces 114 at both ends, and one side of the other bottom plate main body 112 is movably hinged with two folding connection pieces 114 at both ends through hinge joints 115.

A top of the folding connection piece 114 is closed, and an opening is located at a bottom, so that the other bottom plate main body 112 can be turned over relative to the folding connection piece 114 through the hinge joint 115, so that two bottom plate main bodies 112 can be relatively close to each other to realize folding. At the same time, the design that the top of the folding connection piece 114 is closed makes two bottom plate main bodies 112 keep positioning after being unfolded at 180 degrees without excessive rotation, further ensuring the overall structural stability of the baby stroller.

As shown in FIG. 3, in some embodiments, a plurality of reinforcing cross bars 116 and reinforcing longitudinal bars 117 are fixedly arranged inside the bottom plate main body 112; both ends of one side of the bottom plate main body 112 away from the folding rod 111 are respectively hinged with two supports 113, and a stabilizing rod 118 is fixedly arranged between two supports 113.

The design of a plurality of reinforcing cross bars 116 and reinforcing longitudinal bars 117 ensures the structural strength of the bottom plate main bodies 112. The way that the bottom plate main body 112 is hinged with the supports 113 makes the wheels 119 not need to be turned over with the bottom plate main body 112, so that the supports 113 drive the wheels 119 to always keep in contact with the ground, ensuring the stability after the folding state. The setting of the stabilizing rod 118 further ensures the stability between two supports 113.

As shown in FIG. 1, in some embodiments, wheels 119 are movably arranged at a bottom of the supports 113, and a synchronous rod 1191 and a brake rod 1192 are arranged on two opposite wheels 119.

Four wheels 119 are respectively located below two supporting vertical frames 13 and are divided into front wheels 119 and rear wheels 119; the synchronous rod 1191 and the brake rod 1192 are installed on two rear wheels 119; the setting of the synchronous rod 1191 enables two rear wheels 119 to turn synchronously, but they cannot rotate 360 degrees like the front wheels 119; the brake rod 1192 is used to control the rear wheels 119 to be locked, so that the baby stroller remains immobile, and the use is safer.

As shown in FIG. 3, in some embodiments, each telescopic rod 122 includes a sleeve 1221 and a sleeve rod 1222 movably sleeved inside the sleeve 1221; opposite ends of the sleeve rod 1222 and the sleeve 1221 are respectively hinged with the middle connection piece 121 and the support 113, and a notch 1223 is arranged at one end of the sleeve 1221.

When the baby stroller is folded, the telescopic rod 122 needs to be unlocked, so that the sleeve rod 1222 can be drawn out from an interior of the sleeve 1221 to adapt to the elevation of the middle connection piece 121 in the folded state. When the telescopic rod 122 remains locked, the middle connection piece 121 cannot be raised, so the baby stroller cannot be folded. The number of the telescopic rods 122 is four, and the latches 123 on the four telescopic rods 122 all need to be unlocked before folding. When the latches 123 on some telescopic rods 122 are unlocked by mis-touch, the remaining unlocked telescopic rods 122 will still keep the baby stroller from being folded, further ensuring the use safety.

Figure 4:
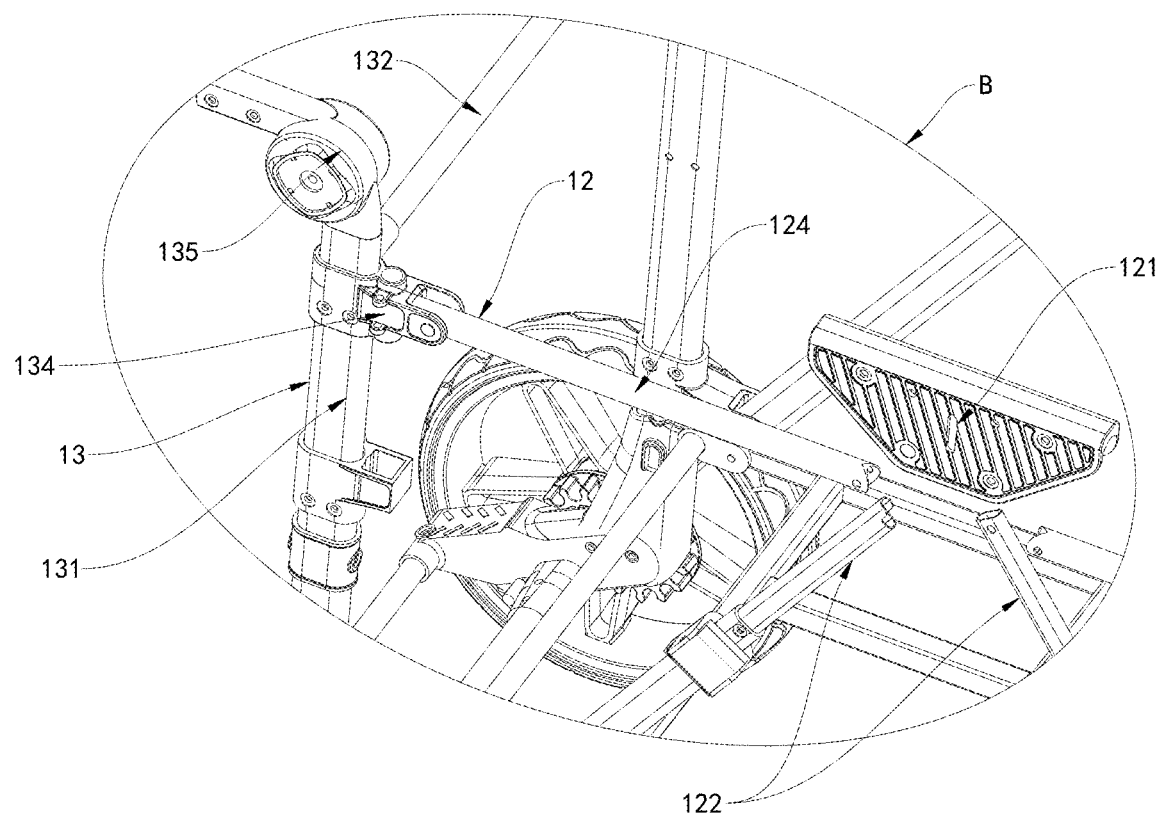
FIG. 4 is an enlarged structural view of part B in FIG. 2.
Figure 5:
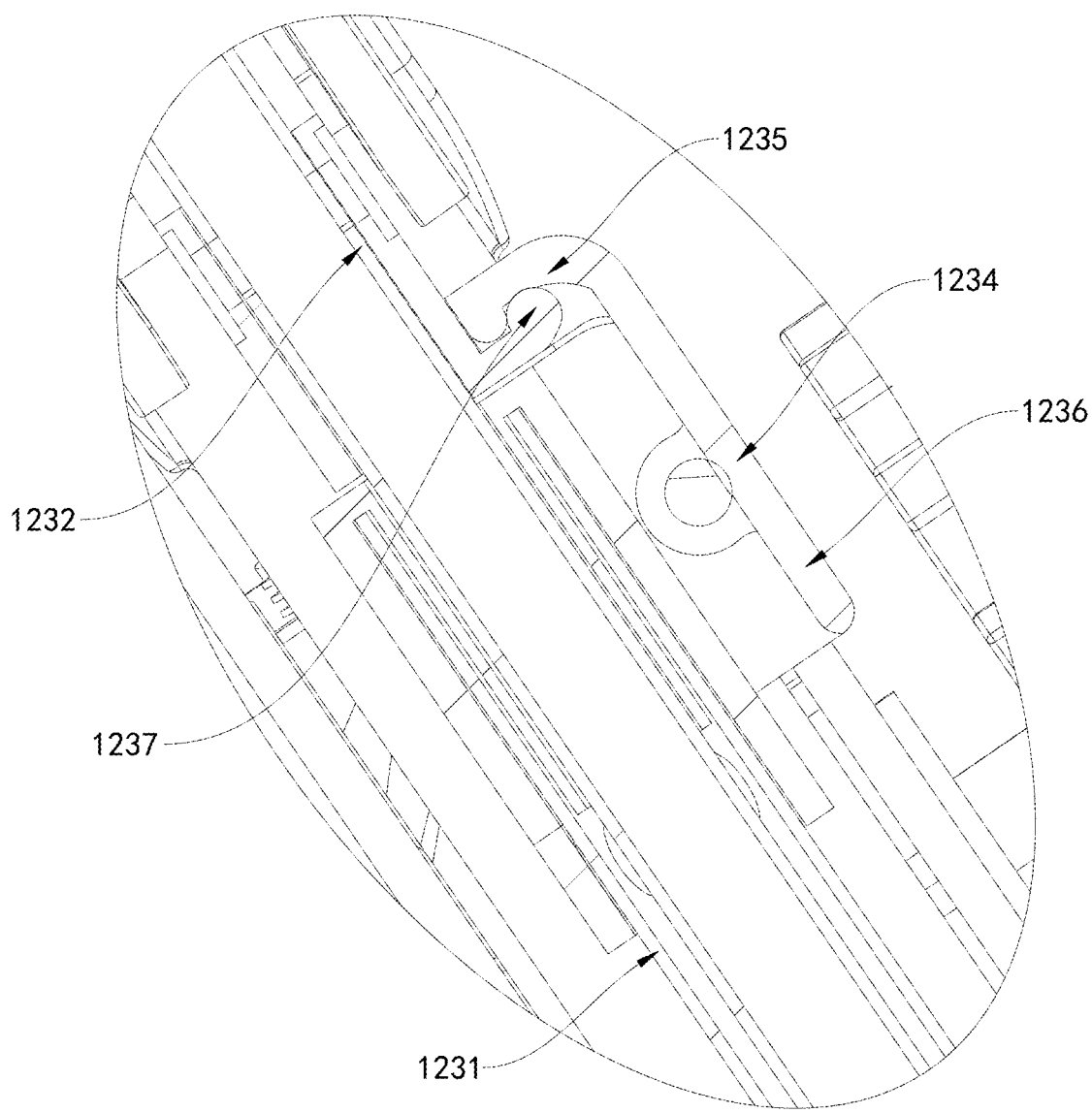
FIG. 5 is a sectional view of the latch structure of the invention.
Figure 6:
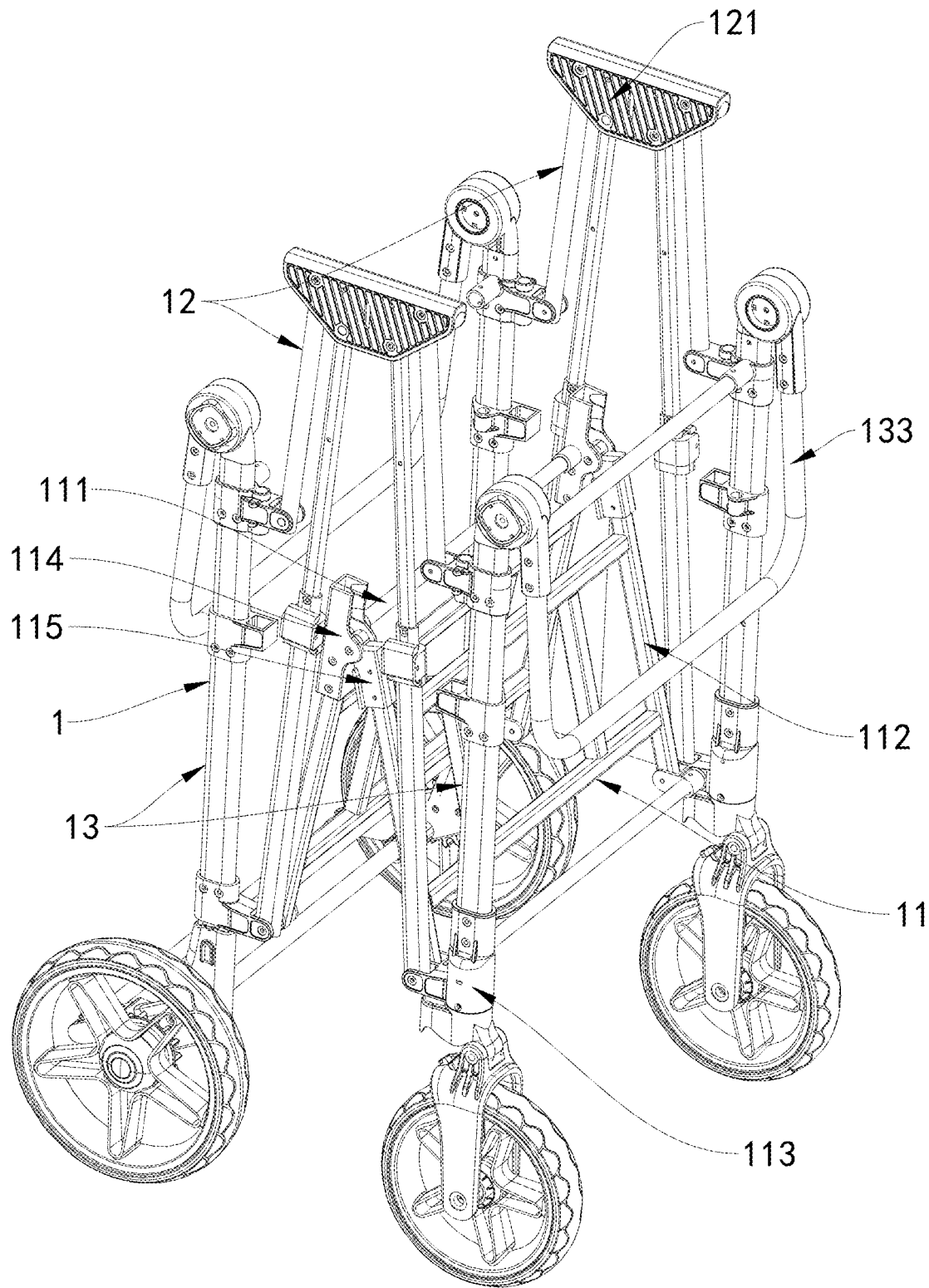
FIG. 6 is a schematic diagram of the folded state of the main body of the baby stroller of the invention.

As shown from FIG. 3 to FIG. 5, in some embodiments, the latch 123 includes a first fixing piece 1231 and a second fixing piece 1232; the first fixing piece 1231 is sleeved on one end of the sleeve 1221, a clamp 1233 clamped with the notch 1223 is fixedly arranged at a bottom of the first fixing piece 1231, a latch plate 1234 is hinged on one side of the first fixing piece 1231, both ends of the latch plate 1234 away from the hinge position are a locking part 1235 and an unlocking part 1236 respectively. The second fixing piece 1232 is fixedly sleeved on the sleeve rod 1222, and a buckle 1237 clamped with the locking part 1235 is arranged on one side of the second fixing piece 1232.

The first fixing piece 1231 is fixed with the clamp 1233 by screws, and the clamp 1233 clamps the notch 1223 to realize the fixation of the first fixing piece 1231 and the sleeve 1221; the second fixing piece 1232 is fixed with the sleeve rod 1222 by screws, the locking part 1235 is in an L-shape, after the locking part 1235 is clamped with the buckle 1237, the sleeve rod 1222 cannot be drawn out from an interior of the sleeve 1221. When unlocking is needed, the lever principle is used to press the unlocking part 1236, so that the locking part 1235 tilts up and detaches from the clamping with the buckle 1237, realizing the unlocking of the latch 123, and the sleeve rod 1222 can be drawn out from the interior of the sleeve 1221. When locking again, the sleeve rod 1222 slides inside the sleeve 1221, so that the second fixing piece 1232 abuts against the first fixing piece 1231, and the locking part 1235 is pressed to be clamped with the buckle 1237, so that the locking can be realized. The operation mode is simple and fast.

As shown in FIG. 4, in some embodiments, two first enclosing rods 124 respectively located above two telescopic rods 122 are also hinged inside the middle connection piece 121.

An opening of the middle connection piece 121 faces downward, which is the same as the principle of the folding connection piece 114, so that two first enclosing rods 124 keep positioning after being unfolded at 180 degrees without excessive rotation, further ensuring the overall structural stability of the baby stroller. The inclined telescopic rods 122 further ensure the structural stability of the folding side frame 12.

As shown in FIG. 4, in some embodiments, the supporting vertical frame 13 includes a second enclosing rod 132 connecting two vertical rods 131 through corner connection pieces 134, and one end of the corner connection piece 134 away from the second enclosing rod 132 is hinged with one end of the first enclosing rod 124.

The setting of the second enclosing rods 132 ensures the structural stability between two opposite vertical rods 131. At the same time, with the first enclosing rods 124, they form a baby stroller fence. One end of the first enclosing rod 124 away from the middle connection piece 121 is hinged with the corner connection piece 134. When the baby stroller is folded, the supporting vertical frame 13 does not participate in folding, and two supporting vertical frames 13 move relatively close with the folding of the folding bottom plate 11 and the folding side frames 12.

As shown in FIG. 4, in some embodiments, the supporting vertical frame 13 further includes handles 133 and two ends of each handle 133 are respectively connected with tops of two vertical rods 131 through connection heads 135.

The connection head 135 includes two turntables locked by screws, the handle 133 can be turned over and close relative to the vertical rods 131 through the connection heads 135, further reducing the folded occupied space. The setting of the handle 133 facilitates users to push the baby stroller, and the number of the handles 133 is two, which facilitates users to freely choose to push from a front or a back of the baby stroller, and the use is more convenient.

In use, when the latches 123 are locked, referring to FIG. 1, after the latches 123 are locked, the sleeve rods 1222 cannot move relative to the sleeves 1221, and the telescopic rods 122 pull the middle connection pieces 121 relative to the supports 113, ensuring the stability of the folding side frames 12 and the folding bottom plate 11. When the baby stroller needs to be folded, the unlocking part 1236 is pressed, so that the locking part 1235 is separated from the clamping with the buckle 1237, and the sleeve rods 1222 can move relative to the sleeves 1221. At this time, the folding rod 111 is lifted, and the folding rod 111 lifts the folding connection pieces 114, so that one bottom plate main body 112 is turned over relative to the folding connection piece 114 through the hinge joint 115. At this time, two supporting vertical frames 13 are pulled by two bottom plate main bodies 112 to move relatively, so that two supporting vertical frames 13 push the first enclosing rod 124, so that the first enclosing rod 124 lifts the middle connection piece 121, and the middle connection piece 121 rises to pull the sleeve rod 1222, so that the sleeve rod 1222 is drawn out from the interior of the sleeve 1221. When the folding rod 111 is lifted in place, two telescopic rods 122 in the folding vertical frame are close to each other, and two supporting vertical frames 13 are also relatively close to each other, which greatly reduces the volume of the baby stroller and is more convenient to carry.

To sum up, the foldable baby stroller has the advantages of convenient and efficient folding operation. By pressing the unlocking part 1236 of the latch 123, the locking of the telescopic rod 122 can be quickly released by using the lever principle. When locking, it only needs to press the locking part 1235 to complete. During the folding process, the movement paths of the folding bottom plate 11 and the folding side frame 12 do not interfere with each other. The folding bottom plate 11 realizes flipping and closing through the hinge connection piece, and the folding side frame 12 adapts to the elevation of the middle connection piece 121 by extracting the sleeve rod 1222 from the sleeve 1221. The two work together smoothly. The supporting vertical frame 13 remains fixed and moves close with the stroller. With the design that the wheels 119 always contact the ground and the stabilizing rod 118, the folding process is ensured to be stable and reliable. The linkage mechanism of multiple latches 123 can not only prevent accidental folding caused by mis-touch but also realize synchronous unlocking when needed, taking into account both safety and operation convenience. Finally, the stroller can be quickly folded, which has a broad application prospect.

Finally, it should be noted that the above descriptions are merely preferred embodiments of the invention and are not intended to limit the scope of the invention. Even though the invention has been described in detail with reference to the foregoing embodiments, those skilled in the art may still modify the technical solutions described in the preceding embodiments or make equivalent replacements to some of the technical features. Any modifications, equivalent substitutions, or improvements made within the spirit and principles of the invention shall fall within the scope of protection of the invention.

The invention claimed is:

1. A foldable baby stroller, including a baby stroller main body, and the baby stroller main body includes a folding bottom plate, folding side frames symmetrically arranged on both sides of the folding bottom plate, and supporting vertical frames;
    the folding bottom plate includes a folding rod and bottom plate main bodies arranged on both sides of the folding rod, and both ends of one side of the bottom plate main body away from the folding rod are provided with supports;
    the folding side frame includes middle connection pieces, two telescopic rods are movably arranged inside each middle connection piece, a bottom end of the telescopic rod is movably connected with one of the supports, and a latch is arranged on each telescopic rod;

the supporting vertical frames include two symmetrically arranged vertical rods, and a bottom end of the vertical rod is fixedly connected with one of the supports;

each telescopic rod includes a sleeve and a sleeve rod movably sleeved inside the sleeve; opposite ends of the sleeve rod and the sleeve are respectively hinged with the middle connection piece and the support, and a notch is arranged at one end of the sleeve;

the latch includes a first fixing piece and a second fixing piece; the first fixing piece is sleeved on one end of the sleeve, a clamp clamped with the notch is fixedly arranged at a bottom of the first fixing piece, a latch plate is hinged on one side of the first fixing piece, both ends of the latch plate away from the hinge position are a locking part and an unlocking part respectively.

2. The foldable baby stroller according to claim 1, wherein both ends of the folding rod are provided with folding connection pieces; one side of one bottom plate main body is fixedly connected with two folding connection pieces at both ends, and one side of the other bottom plate main body is movably hinged with two folding connection pieces at both ends through hinge joints.

3. The foldable baby stroller according to claim 2, wherein a plurality of reinforcing cross bars and reinforcing longitudinal bars are fixedly arranged inside the bottom plate main body; both ends of one side of the bottom plate main body away from the folding rod are respectively hinged with two supports, and a stabilizing rod is fixedly arranged between two supports.

4. The foldable baby stroller according to claim 1, wherein wheels are movably arranged at a bottom of the supports, and a synchronous rod and a brake rod are arranged on two opposite wheels.

5. The foldable baby stroller according to claim 1, wherein the second fixing piece is fixedly sleeved on the sleeve rod, and a buckle clamped with the locking part is arranged on one side of the second fixing piece.

6. The foldable baby stroller according to claim 1, wherein the folding side frame comprises two first enclosing rods respectively located above two telescopic rods; the two first enclosing rods and the two telescopic rods are hinged inside the middle connection piece.

7. The foldable baby stroller according to claim 6, wherein the supporting vertical frame includes a second enclosing rod connecting two vertical rods through corner connection pieces, and one end of the corner connection piece away from the second enclosing rod is hinged with one end of the first enclosing rod.

8. The foldable baby stroller according to claim 1, wherein the supporting vertical frame further includes handles and two ends of each handle are respectively connected with tops of two vertical rods through connection heads.

* * * * *